2,786,794

POLYGLYCIDYL ETHER OF A POLYHYDRIC PHENOL HOT SETTING ADHESIVE AND METHOD OF UNITING ARTICLES THEREWITH

Alphonse Gams and Wilhelm Kraus, Basel, Eduard Preiswerk, Riehen, Gustav Widmer, Basel, and Werner Wieland, Riehen, Switzerland, assignors to Ciba Limited, Basel, Switzerland, a Swiss firm No Drawing. Application May 27, 1952, Serial No. 290,312

Claims priority, application Switzerland July 13, 1945

12 Claims. (Cl. 154—140)

It is known that metals can be adhesively united by means of thermoplastic artificial resins. However, this procedure has several disadvantages.

As is known the mechanical strength of a thermoplastic artificial resin depends on its molecular weight. Substances of this kind, when of low molecular weight, have a low softening point and yield solutions of low viscosity, but they have a strength which, although sufficient for lacquers, is insufficient for adhesively unting materials such, for example, as metals, which are subjected to high stresses.

Thermoplasts of high molecular weight do indeed possess a strength sufficient for adhesively uniting materials. However, when heated they soften to viscous plastic masses; their solutions are highly viscous and liberate the solvent only with difficulty and incompletely, because the formation of a viscous superficial crust makes it very difficult for the residual solvent to escape.

For adhesively uniting materials having very finely porous surfaces or surfaces practically free from pores, as is the case with most metals, it is generally necessary to use resins which melt to a very thinly fluid condition or to use resin solutions which are very thinly viscous, because the adhesive must completely fill the very fine irregularities of such surfaces.

On the other hand, during uniting process, it must be possible to convert these resins into a condition in which they acquire the mechanical strength necessary for the purpose which they are to serve.

Solvents cannot be used in order to assist in overcoming these difficulties, because even the small residues of solvents which remain in the artificial resins considerably reduce the strength of the adhesive bond. Moreover, many materials, especially metals, owing to their non-porous surface do not permit of the subsequent evaporation of the solvents.

For the foregoing reasons neither thermoplasts of low molecular weight nor those of high molecular weight are suitable for adhesively uniting materials of any kind, especially those of a non-porous character, when high strength is required.

A further disadvantage of thermoplastic artificial resins is that they always remelt or resoften when heated.

The use of hardenable artificial resins for adhesively uniting materials such as metals or the like leads to very brittle bonds of low tenacity and shear strength.

The best of the hitherto known processes for adhesively uniting metals by means of artificial resins actually provide satisfactory shear strength but a disadvantage of these methods is that they have to be carried out under pressure, in other words, expensive presses are needed in many cases.

The present invention is based on the surprising discovery of a hardenable adhesive agent which does not possess the disadvantages referred to above and is therefore excellently well suited for adhesively uniting materials of all kinds, especially those having non-porous surfaces, such as metals, glass, porcelain, mica and the like, which afford very little anchoring means for the adhesive.

Broadly stated, the new adhesive agent may be defined as an unreacted mixture of (a) an ethylene oxide derivative obtained by reacting a phenol containing at least two phenolic hydroxy groups and being free from other reactive groups with epichlorhydrin or dichlorhydrin in an alkaline medium and (b) a suitable hardener, which mixture is capable of hot-setting, whereby the desired adhesive union may be realized by subjecting the mixture to hot hardening between the surfaces to be united.

In one form thereof, the new adhesive agent consists of a fusible and hardenable mixture, as defined in the preceding paragraph, which has the property of forming a thinly fluid melt, whereby it is extraordinarily well suited for adhesively uniting materials of all kinds, especially those of a non-porous character such as metals, glass, porcelain, mica and the like. This property enables the adhesive to be interposed between the surfaces to be united in a very thin layer, whereby the adhesive is able to find effective anchorage in the very fine irregularities in the said surfaces without the addition of agents reducing the viscosity, more especially solvents.

Suitable starting materials for making the ethylene oxide derivatives of phenols are phenols which contain at least two hydroxyl groups. Especially suitable are polynuclear phenols of which the nuclei are connected together by a bridge such, for example, as 4:4'-dihydroxydiphenyl-methane, 4:4'-dihydroxydiphenyl-methylmethane and 4:4'-dihydroxydiphenyl-dimethylmethane. The resins obtained from these compounds, and consisting mainly of the bis-ethylene oxide compounds, are hereinafter referred to briefly as methane, methylmethane and dimethylmethane resins, respectively.

In admixture with the aforesaid phenols in which the nuclei are connected by a carbon bridge there may be used polynuclear phenols of which the nuclei are connected together by a sulfur bridge, for example, 4:4'-dihydroxydiphenyl sulfone.

There may also be used polyhydric phenols such as resorcinol, hydroquinone and the like.

It has been found that dimethylmethane resin, if used with a suitable hardening agent, makes heavy-duty bonds. Results obtained with other resins are less good but still sufficient for many purposes.

The introduction of the ethylene oxide groups into the phenols may be brought about in known manner by reaction with epihalogen hydrins or dihalogen hydrins in an alkaline medium. Especially suitable is epichlorhydrin or dichlorhydrin, which latter is converted into epichlorhydrin during the reaction with the phenol.

As hardening agents, use is preferably made—because of the achieved high shear strengths—of a cyanamide polymer, preferably dicyandiamide or melamine, or of a polyamine, preferably ethylene-diamine, N:N-diethyl-ethylenediamine or triethylene-tetramine. Mixtures of these hardening agents may also be used.

The relative proportions of the ethylene oxide compound and the hardening agent may vary within fairly wide limits. In the case of bases about 1 to 10 percent thereof on the weight of the ethylene oxide compound generally suffices; and in the case of other hardening agents such, for example, as dicyandiamide very good values for the strengths of the adhesive bond can be obtained by the addition of 2 to 10 percent.

For adhesively uniting the surfaces of metals, it may also be of advantage in many cases previously to oxidize or to phosphatize the surfaces to be united or to provide or in some other manner to increase an existing layer on the said surfaces or to apply a layer thereof. Such procedures obviously only apply when the layer produced adheres firmly to the metal as, for example, in the case of aluminum and iron. In this manner shear strengths can be obtained which are somewhat higher than those obtainable with materials not so pretreated.

In making the mixture used for adhesive bonding it is advantageous in some cases, for instance, when dicyandiamide or similar substances are used, to first treat the ethylene oxide compound with a small quantity of the hardening agent before the so pretreated product is mixed with the bulk of the hardening agent.

When necessary, the surfaces of the materials to be united are freed from adherent dirt, oil and the like in the usual manner before being adhesively united, for example, by cleaning the surfaces with emery paper or by means of a sand-blasting, by dipping or by treatment with organic solvents.

The adhesive agent in this embodiment may be used, for example, by applying the powdered mixture dry to the hot surfaces of the material to be united, for instance, metal sheets. The adhesive agent is advantageously used in the form of a cold compressed mixture, advantageously in the form of a solder stick. The adhesive agent melts upon contact with the hot surfaces to form a very thinly fluid melt. Alternatively, the mixture may be melted before use and the molten mixture applied to the, advantageously hot, surfaces. The surfaces to be united are then brought together, if desired by mechanical means, for example by clamps, maintained in the desired position, and then the adhesive agent is subjected to hardening with heat.

It is, however, not intended to exclude from the invention the application of the adhesive mixture in the form of a solution or dispersion and bringing together the surfaces to be united after the removal of the solvent or dispersing medium, and then hardening the mixture.

The heat treatment may be carried out in many different ways, for example, in a hot oven, by means of a flame, for example, the flame of a welding burner or a blowlamp or by heating by electrical resistance the metals to be united by means of low tension currents or high frequency currents. Electrically heated wires may also be led through the adhesive joint and left in the finished product. This is especially suitable in the case of articles of large dimensions and in the case of materials which are either non-conductors or bad conductors of electricity and heat.

The hardening is conducted at temperatures of about 100–200° C. or higher. The period of hardening is, as a rule, longer at low temperatures than it is at high temperatures. At low temperatures the hardening may require one half to several hours, whereas at high temperatures it can be completed within a few minutes. In the case of thick bodies the time taken for heating up must be taken into account and in the case of many materials bad heat conductivity must also be considered.

The new method possesses very improved advantages over the known methods. In contradistinction to the latter processes the required artificial resin is produced only during the adhesion process, so that all stages from a thinly fluid melt to a solid gel of high softening point are passed through between the surfaces to be united. In this manner the advantages of thermoplastic artificial resins of low molecular weight and of those of high molecular weight are combined without their disadvantages having to be tolerated.

A special advantage of the process is that the adhesive union can be brought about without external pressure.

The surfaces to be united need only be brought together so that it generally suffices to maintain them in contact in known manner by means of a vise, clamps or the like. The use of expensive presses is dispensed with. Naturally the adhesion process may alternatively be carried out under pressure.

The special nature of the said new adhesive agents enables the articles which have been adhesively united to be released while hot, that is to say taken out of the oven or out of the clamp or press. In particular cases however, it may be of advantage to release the article only after cooling.

The new adhesive agents possess as such a very high mechanical strength in the hardened condition.

The hardened adhesive agent and therefore the adhesive bonds obtained therewith are very resistant to hot and cold water and also to solvents.

In addition to uniting together the surfaces of similar materials the surfaces of widely differing materials may be united, for example, iron and aluminum, copper and iron, glass and aluminum, wood and aluminum, rubber and iron, etc.

An especially suitable method for testing the strengths of the adhesive joints is the determination of the shear strength.

The shear strength amounts, for example, in the case of aluminum sheets, when dicyandiamide is used as hardening agent, to more than 3 kg./mm.$^2$, that is to say many times the value obtainable with known methods of adhesion. Also in the case of other materials of metallic or other character superior values of shear strength are obtainable.

The following examples illustrate this phase of the invention, the parts being by weight. The indicated experimental conditions and the shear strength values obtained are not the best obtainable in each case; the latter are mostly the mean values ascertained by several tests.

In all these examples the procedure is as follows: The dry adhesive agent is applied in powder form to the preheated materials. The surfaces of the bodies to be united are held together by means of clamps, and then subjected to a heat treatment for the purpose of hardening the adhesive agent at various temperatures and periods of heating.

For testing the shear strength bodies 1–5 mm. thick, 130 mm. long and 25 mm. wide are used with an overlap of 1 cm. In the case of metals unless otherwise stated the thickness of the sheet is 0.8–1 mm., the millimeter measurements given in the examples relating to the thickness. The dimensions of the bodies of the same material are in all cases the same. For adhesively uniting materials of low strength (glass, porcelain and the like) thicker bodies are used. In the case of thin test strips the strength of the adhesive joint is so strong that the material itself breaks before the adhesive joint. The values given for fracture of the material represent the tensile strength of the material.

EXAMPLE 1

*Adhesive agent A*

100 parts of the dimethyl-methane resin
4 parts of dicyandiamide

*Adhesive agent B*

100 parts of the dimethyl-methane resin
10 parts of melamine

| Adhesive agent | Materials united | Hardening temperature, °C. | Hardening period, minutes | Shear strength in kg./mm.$^2$ |
|---|---|---|---|---|
| A | aluminum/aluminum | 200 | 15 | 2.32 |
| A | ....do.... | 200 | 30 | 3.03 |
| B | ....do.... | 200 | 30 | 2.93 |

EXAMPLE 2

*Adhesive agent*

100 parts of dimethyl-methane resin
x parts of a hardening agent
Material united: aluminum/aluminum

| Hardening agent | $x$ | Hardening temperature, °C. | Hardening period | Shear strength, in kg./mm.² |
|---|---|---|---|---|
| ethylene-diamine | 2 | 200 | 30 mins | 2.0 |
| N:N-diethyl-ethylene-diamine | 2 | 100 | 4 hours | 1.6 |
| triethylene-tetramine | 2 | 200 | 2 hours | 1.86 |
| Do | 30 | 200 | 2 hours | 1.64 |
| Do | 30 | 200 | 20 mins | 1.3 |

EXAMPLE 3

*Adhesive agent A*

100 parts of methane resin
10 parts of dicyandiamide

*Adhesive agent B*

100 parts of methylmethane resin
10 parts of dicyandiamide

*Adhesive agent C*

100 parts of methane resin
30 parts of melamine

*Adhesive agent D*

100 parts of methylmethane resin
30 parts of melamine

Material united: aluminum/aluminum
Hardening temperature: 200° C.

| Adhesive agent | Hardening period, minutes | Shear strength, in kg./mm.² |
|---|---|---|
| A | 30 | 1.1 |
| B | 20 | 0.9 |
| C | 20 | 1.44 |
| D | 30 | 1.0 |

EXAMPLE 4

From 120 parts of resorcinol and 260 parts of dichlorhydrin there is prepared in an alkaline medium a resin which has more than one ethylene oxide group in the molecule.

*Adhesive agent*

100 parts of the above resin
4 parts of dicyandiamide
Material united: aluminum/aluminum
Hardening temperature: 200° C.

| Hardening period | Shear strength, in kg./mm.² |
|---|---|
| 10 mins | 2.05 |
| 60 mins | 3.0 |

EXAMPLE 5

*Adhesive agent*

100 parts of dimethylmethane resin
20 parts of melamine
Hardening temperature: 200° C.

| Material united | Hardening period, minutes | Shear strength |
|---|---|---|
| iron/iron | 30 | 3.0 |
| copper/copper | 30 | 1.0 |
| zinc/zinc | 30 | 1.5 |

A second embodiment of adhesive agent, according to the invention, assumes the form of a hardenable mixture which is spreadable at ordinary temperature and thus does not require conversion into a thinly fluid melt prior to application to the surface to be united. This mixture, like the previously described adhesive agent, is an unreacted mixture of (a) an ethylene oxide derivative obtained by reacting a phenol containing at least two phenolic hydroxy groups with epichlorhydrin or dichlorhydrin in an alkaline medium and (b) a suitable hardener. The mixture differs from the first-described mixture in that, due to its spreadability at ordinary temperature, it can be interposed or spread between the cold surfaces to be united and then be subjected to hot hardening to realize the desired adhesive union.

Hardenable mixtures which are spreadable at ordinary temperature, for use according to the invention, may be obtained in various ways:

Ethylene oxide derivatives of phenols which are not completely polymerized and which are still spreadable at ordinary temperature may be mechanically admixed with a hardening agent prior to application to or on the surfaces to be united. It may be an advantage to add a liquid, non-volatile under the conditions of the process, to the mixtures of spreadable ethylene oxide derivatives of phenols with hardening agents, especially in case of using solid hardening agents.

However, readily hardenable masses which are spreadable at ordinary temperature can also be obtained from ethylene oxide derivatives which are solid at ordinary temperature by admixture with liquid hardening agents which are non-volatile under the conditions of the process or by admixture with solid hardening agents and with liquids which are non-volatile under the conditions of the process.

As suitable ethylene oxide derivatives of phenols, which derivatives carry at least two ethylene oxide groups, use may be made of the spreadable or solid resinous products mentioned in the first part of this application. Especially useful are resinous ethylene oxide derivatives of polynuclear phenols, the phenol nuclei of which are connected together by a carbon bridge, for example of a 4:4'-dihydroxy-diphenyl-methane, preferably of 4:4'-dihydroxy-diphenyl-dimethyl-methane.

As solid hardening agents there may be used the previously enumerated solid compounds, for example cyanamide polymers, especially dicyandiamide, melamine etc. As liquid hardening agents, there may preferably be used liquid polyamines, e. g. triethylene tetramine or the like. In many cases it is preferable to use a mixture of different hardening agents, e. g. of one liquid and one solid, of two liquid or of two solid hardening agents.

As liquids which are non-volatile under the conditions of the process and which may be used together with solid hardening agents, there may be named liquid ethers of polyvalent alcohols, e. g. resorcinol dimethylether, and also liquid esters of polybasic carboxylic acids, e. g. phthalic acid dibutyl ester, and e. g. furfural. In many cases, e. g. in the case of linseed oil, terpenes, such as pinene, cymol, monomeric cyclopentadiene, etc., it is necessary to use them in admixture with other non-volatile liquids, in order to obtain a mixture which is spreadable and homogeneous at ordinary temperature. In selecting the non-volatile liquid, care should be taken to assure a homogeneous hot hardening, i. e. that no separation takes place in the hardened product between hardened resin and non-volatile liquid (no sweating out).

In determining the non-volatility of the liquid hardening agent or the liquids to be used, the boiling point or the volatility of the liquids per se are not alone determinative, the important thing being rather the volatility from their mixtures with the resinous ethylene oxide derivative under the conditions of the process. It is e. g. known that the speed of evaporation of solvents from resin solutions, films or formed articles is appreciably lower than that of the pure solvents.

The combination of the individual constituents into a spreadable mixture can be carried out according to any desired conventional mixing methods, particular care being taken that that whatever solid materials may be present are in such an enhanced state of distribution and mechanical comminution that settling thereof is prevented. Where this is not realizable, the solid materials are homogeneously distributed by stirring prior to use or are added only just prior to use.

The spreadable adhesives are applied to the cold metal sheets with the spatula or brush or in other suitable manner and are then subjected to the heat hardening between the superposed metal surfaces. In some cases, as where the spreadable adhesive loses its spreadability very fast, the application must take place immediately after the preparation thereof.

The articles to be joined together should, if necessary, be freed, in usual manner and prior to the joining together, of adherent dirt, oil, etc. In joining metals together, it may also be advantageous preliminarily to oxidize or phosphatize the metal surfaces to be united or otherwise to provide them with a native or applied layer.

The hardening is carried out according to the disclosure in the first part of this application. After application of the adhesive material, the surfaces to be united may be brought together, if desired by mechanical means, for example by means of clamps, maintained in the desired position, and then the hardening treatment carried out.

The heat treatment may be carried out in many different ways, for example, in a hot oven, by means of a flame, for example, the flame of a welding burner or a blowlamp or by heating by electrical resistance the metals to be united by means of low tension currents or high frequency currents. Electrically heated wires may also be led through the adhesive joint and left in the finished product. This is especially suitable in the case of articles of large dimensions and in the case of materials which are either non-conductors or bad conductors of electricity and heat.

The hardening is conducted at temperatures of about 100–200° C. or higher. The period of hardening is, as a rule, longer at low temperatures than it is at high temperatures. At low temperatures the hardening may require one half to several hours, whereas at high temperatures it can be completed within a few minutes. In the case of thick bodies the time taken for heating up must be taken into account and in the case of many materials bad heat conductivity must also be considered.

As in the first-described embodiment, a special advantage of the process is that the adhesive union can be brought about without external pressure. The surfaces to be united need only be brought together so that it generally suffices to maintain them in contact in known manner by means of a vise, clamps or the like. The use of expensive presses is dispensed with. Nevertheless the adhesion process may be carried out under pressure if desired.

Moreover, the articles which have been adhesively united may be released while hot, that is to say taken out of the oven or out of the clamp or press. In particular cases however, it may be of advantage to release the article only after cooling.

The resultant shear strengths—which are good measures of the strengths of the adhesive joints—depend upon the nature of the articles joined together. With e. g. aluminum and iron they are very good, while other materials show values which are not quite as good.

The following examples explain this embodiment of the present invention in greater detail, without limiting it. In the absence of contrary indications, the parts joined together, and subjected to shear strength tests, are aluminum sheets of 13 cm. length, 2.5 cm. width and 0.1 cm. thickness with an overlap of 1 cm., and the hardenings were carried out at 200° C. For adhesively uniting materials of low strength (glass and the like), thicker bodies are used.

EXAMPLE 6

*Preparation of a spreadable ethylene oxide resin*

Into a mixture, which contains about 2 mols of glycerin-α-dichlorhydrin per 0.7 mol of dihydroxydiphenylpropane, 4 mols of caustic soda in the form of a 30% aqueous solution are run within ½ hour at 50–60° C., after-condensation is carried out for 5 minutes, and the resin is immediately washed free of alkali and salts. Then the resin is dried in a vacuum of 10–20 mm. of mercury. It is a spreadable mass.

EXAMPLE 7

10 parts by weight of the ethylene oxide resin of Example 6 are mixed with 1 part by weight of dicyandiamide, and aluminum sheets are glued together with the mixture, as above. With a hardening period of 60 minutes, a shear strength of 1.8 kg./mm.² is achieved.

EXAMPLE 8

30 parts by weight of the ethylene oxide resin of Example 6 are heated with 6 parts by weight of resorcinol-dimethyl ether for one hour under reflux in an oil-bath heated to 150° C. There results a thinly fluid mass which is liquid in the cold.

*Adhesive agent A*

0.75 part of dicyandiamide is added to 6 parts by weight of the above mass. The mixture can be applied with a brush to cold aluminum sheets.

*Adhesive agent B*

1.5 parts by weight of melamine are added to 6 parts by weight of the above mass. The mixture is applied with a brush to cold aluminum sheets.

| Adhesive agent | Hardening period, minutes | Shear strength, kg./mm.³ |
| --- | --- | --- |
| A | 20 | 1.6 |
| B | 60 | 2.2 |

EXAMPLE 9

10 parts by weight of the resin prepared according to Example 6 are mixed in a suitable mixing machine with 2 parts by weight of melamine, and 3 parts by weight of triethylenetetramine are added to the mixture with very good cooling. The viscous mass is applied to aluminum sheets with a spatula. The mixture has to be worked up promptly, since its viscosity is constantly increasing. After a 30 minute hardening period, a shear strength of 1.5 kg./mm.² is realized.

EXAMPLE 10

*Preparation of a solid ethylene oxide resin*

Into a mixture which contains about 2 mols of glycerine-α-dichlorhydrin per 1.1 mol of dihydroxydiphenylpropane, 4.3 mols of caustic soda in the form of a 30% aqueous solution are run within 1 hour at 80–90° C., further condensation carried out at 90–92° C. until a test specimen of the resin, washed neutral, is hard enough to be broken in the cold, which is the case after about 1 hour. The resin, washed free of alkali and salts, is freed of water by heating to 170° C.

The resultant resin is hard enough to be broken in the cold.

EXAMPLE 11

10 parts by weight of the ethylene oxide resin of Example 10 are dissolved in 1 part by weight of ethyl- or phenyl-isocyanate and to this solution are added 3.5 parts by weight of dicyandiamide or melamine and 0.06 part by weight of diphenylguanidine. The mixtures are readily applicable at ordinary temperature, but lose this capacity after some time so that they must be used promptly after the admixture.

At a hardening temperature of 150–200° C. and a hardening period of about 1 hour, shear strengths between 1.5 kg./mm.$^2$ and 2.0 kg./mm.$^2$ are attainable on aluminum sheets.

EXAMPLE 12

10 parts by weight of the ethylene oxide resin of Example 10 are incorporated into 2–3 parts by weight of triethylenetetramine in a very efficient mixing machine with good cooling. 1 part by weight of dicyandiamide is added to the spreadable mass. The mixture, the viscosity of which increases rapidly, is applied with the spatula immediately after its preparation onto the cold sheets to be joined. A ½ hour hardening produces a shear strength of about 1.5 kg./mm.$^2$.

EXAMPLE 13

100 parts by weight of the resin prepared according to Example 10 are refluxed with 20 parts by weight of furfural while stirring for 2 hours in a boiling water-bath. A well spreadable solution results.

To 6 parts by weight of this solution, there are added 1.5 parts by weight of melamine. The resultant adhesive agent can be readily applied onto cold aluminum sheets and, after a hardening period of 30 minutes, a shear strength of 2.0 kg./mm.$^2$ is realized.

EXAMPLE 14

100 parts by weight of the ethylene oxide resin of Example 10 are heated with 20 parts by weight of resorcinol dimethylether under reflux for 2 hours in a boiling water bath. A readily applicable solution results.

To 6 parts by weight of this solution, there are added for:

Adhesive agent A: 0.75 part by weight of dicyandiamide;
Adhesive agent B: 1.5 parts by weight of melamine.

All the adhesive agents are well applicable in the cold.

| Adhesive agent | Hardening period, minutes | Shear strength, kg./mm.$^2$ |
| --- | --- | --- |
| A | 20 | 2.2 |
| B | 30 | 2.4 |

EXAMPLE 15

100 parts by weight of the resin prepared according to Example 10 are refluxed with 20 parts by weight of phthalic acid dibutylester for 2 hours in the boiling water-bath. A spreadable mass results.

To 6 parts by weight thereof, there are added for:

Adhesive agent A: 0.75 part by weight of dicyandiamide;
Adhesive agent B: 1.5 parts by weight of melamine.

All the adhesive agents are applied with the spatula at ordinary temperature.

| Adhesive Agent | Hardening Period | Shear Strength, kg./mm.$^2$ |
| --- | --- | --- |
| A | 30 mins | 2.0 |
| B | 1 hour | 2.8 |

EXAMPLE 16

20 parts by weight of the ethylene oxide resin of Example 10 are refluxed with 4 parts by weight of turpentine oil and 4 parts by weight of furfural for 1 hour in an oil-bath at 150° C. A well spreadable resin solution results.

To 6 parts by weight of this resin solution, there are added 1.5 parts by weight of melamine. The resultant adhesive agent is well spreadable at ordinary temperature. With a hardening period of 30 minutes, a shear strength of 1.9 kg./mm.$^2$ is obtained.

EXAMPLE 17

20 parts by weight of the resin prepared according to Example 10 are refluxed in a mixture of 4 parts by weight of cymol and 2 parts by weight of furfural for 2 hours in an oil-bath heated to 150° C. There results a resin solution which is very well spreadable.

To 6 parts by weight of this solution, there are added 1.5 parts by weight of melamine.

The adhesive agent is readily applicable at ordinary temperature. With a hardening period of 30 minutes, a shear strength of 2.0 kg./mm.$^2$.

EXAMPLE 18

20 parts by weight of the resin obtainable according to Example 10 are refluxed in a mixture of 4 parts by weight of monomeric cyclopentadiene and 4 parts by weight of furfural for 2 hours in an oil-bath heated to 120° C.

To 6 parts by weight of this solution, there are added 1.5 parts by weight of melamine.

The adhesive agent can be readily applied in the cold. With a hardening period of 30 minutes, a shear strength of 1.9 kg./mm.$^2$ is obtained.

EXAMPLE 19

20 parts by weight of the resin obtaintable according to Example 10 are refluxed in a mixture of 4 parts by weight of linseed oil and 4 parts by weight of furfural for 2 hours in an oil-bath heated to 150° C. A resin solution which is well spreadable in the cold is obtained.

To 6 parts by weight of this resin solution, there are added 1.5 parts by weight of melamine.

The adhesive agent is well applicable in the cold with the spatula. With a hardening period of 30 minutes, a shear strength of 1.7 kg./mm.$^2$.

EXAMPLE 20

Adhesive agent A

A mixed resin is prepared from 210 parts by weight of 4,4′-dihydroxydiphenyl-dimethylmethane and 230 parts by weight of 4,4′-dihydroxydiphenyl sulfone by condensation with 475 parts by weight of α-dichlorhydrin in alkaline medium. 10 parts by weight of this resin are dissolved in 2.5 parts by weight of resorcinol dimethylether and 0.5 part by weight of dicyandiamide is added to the solution. The adhesive agent is well applicable in the cold.

Adhesive agent B

A resin is prepared from 120 parts by weight of resorcinol and 260 parts by weight of α-dichlorhydrin in alkaline medium. 10 parts by weight of this resin are dissolved in 2 parts by weight of dibutyl phthalate, and 0.5 part by weight of dicyandiamide is added to the solution. The adhesive agent is well applicable in the cold with a spatula.

Adhesive agent C

A dihydroxydiphenyl-methylmethane resin is prepared from 94 parts by weight of phenol and 22 parts by weight of para-acetaldehyde in acid medium. This is converted with 129 parts by weight of α-dichlorhydrin in alkaline medium into an ethylene oxide resin. 10 parts by weight of this resin are dissolved in 4 parts by weight of dibutyl phthalate, and 0.5 part of dicyandiamide are added to the solution. The mixture is well applicable by brush in the cold.

| Adhesive agent | Hardening period, minutes | Shear strength, kg./mm.² |
|---|---|---|
| A | 30 | 0.63 |
| B | 30 | 2.14 |
| C | 30 | 2.00 |

EXAMPLE 21

50 parts by weight of the resin prepared according to Example 10 are dissolved hot with 15 parts by weight of phthalic acid dibutylester. 7.5 parts by weight of dicyandiamide are added to this resin solution and various metals glued together with the mixture. Hardening period: 30 minutes.

| Metals Glued together | Shear Strength, kg/mm.² |
|---|---|
| copper/copper | 2.0 |
| iron/iron | 2.54 |
| zinc/zinc | 0.53 |
| brass/brass | 1.42 |

The present application is carved out of and is a continuation in part of application Serial No. 680,860, filed July 1, 1946, for Method of Adhesively Uniting Materials, Especially Metals, and Adhesives Therefor, and in-part of application Serial No. 761,150, filed July 15, 1947, for Method of Adhesively Uniting Materials, Especially Metals and Adhesive Therefor, both of which applications are now abandoned.

Having thus disclosed the invention, what is claimed is:

1. A composition of matter which is capable of hardening on setting and is suitable for use as a hot setting adhesive, which comprises an unreacted mixture of a hardenable resinous polyglycidyl ether of a polyhydric phenol containing 1,2-epoxy groups and a hardener selected from the group consisting of dicyandiamide and melamine.

2. A composition of matter which is capable of hardening on setting and is suitable for use as a hot setting adhesive, which comprises an unreacted mixture of a hardenable resinous polyglycidyl ether of a polyhydric phenol containing 1,2-epoxy groups and dicyandiamide.

3. A composition of matter which is capable of hardening on setting and is suitable for use as a hot setting adhesive, which comprises an unreacted mixture of a hardenable resinous polyglycidyl ether of a polyhydric phenol containing 1,2-epoxy groups and melamine.

4. A method of uniting articles having relatively non-porous surfaces which comprises effecting the following series of steps: applying a coating of the composition defined by claim 1, to at least one of the surfaces, bringing the surfaces to be united into contact and hardening the adhesive between the surfaces by heating.

5. A method of uniting articles having relatively non-porous surfaces which comprises effecting the following series of steps: applying a coating of the composition defined by claim 1, while in fluid condition, to at least one of the surfaces, bringing the surfaces to be united into contact and hardening the adhesive between the surfaces by heating.

6. A method of uniting articles having relatively non-porous surfaces which comprises effecting the following series of steps: applying a coating of the composition defined in claim 2, to at least one of the surfaces, bringing the surfaces to be united into contact and hardening the adhesive between the surfaces by heating.

7. A method of uniting articles having relatively non-porous surfaces which comprises effecting the following series of steps: applying a coating of the composition defined in claim 3, to at least one of the surfaces, bringing the surfaces to be united into contact and hardening the adhesive between the surfaces by heating.

8. A composite multi-part article, parts of which have interposed therebetween and in contact therewith and are adhesively united together by the hardened adhesive composition defined in claim 1.

9. A composite multi-part article, parts of which have interposed therebetween and in contact therewith and are adhesively united together by the hardened adhesive composition defined in claim 2.

10. A composite multi-part article, parts of which have interposed therebetween and in contact therewith and are adhesively united together by the hardened adhesive composition defined in claim 3.

11. A composition of matter which is capable of hardening on setting and is suitable for use as a hot setting adhesive, which comprises an unreacted mixture of a hardenable resinous polyglycidyl ether of 4:4'-dihydroxydiphenyldimethylmethane containing 1,2-epoxy groups and dicyandiamide.

12. A composition of matter which is capable of hardening on setting and is suitable for use as a hot setting adhesive, which comprises an unreacted mixture of a hardenable resinous polyglycidyl ether of 4:4'-dihydroxydiphenyldimethylmethane containing 1,2-epoxy groups and melamine.

References Cited in the file of this patent

UNITED STATES PATENTS

| 1,019,407 | Baekeland | Mar. 5, 1912 |
| 2,444,333 | Castan | June 29, 1948 |
| 2,585,115 | Greenlee | Feb. 12, 1952 |